Oct. 30, 1945.　　　O. RASOR　　　2,388,013
AIRPLANE TOWING MECHANISM
Filed March 25, 1942　　　2 Sheets-Sheet 1
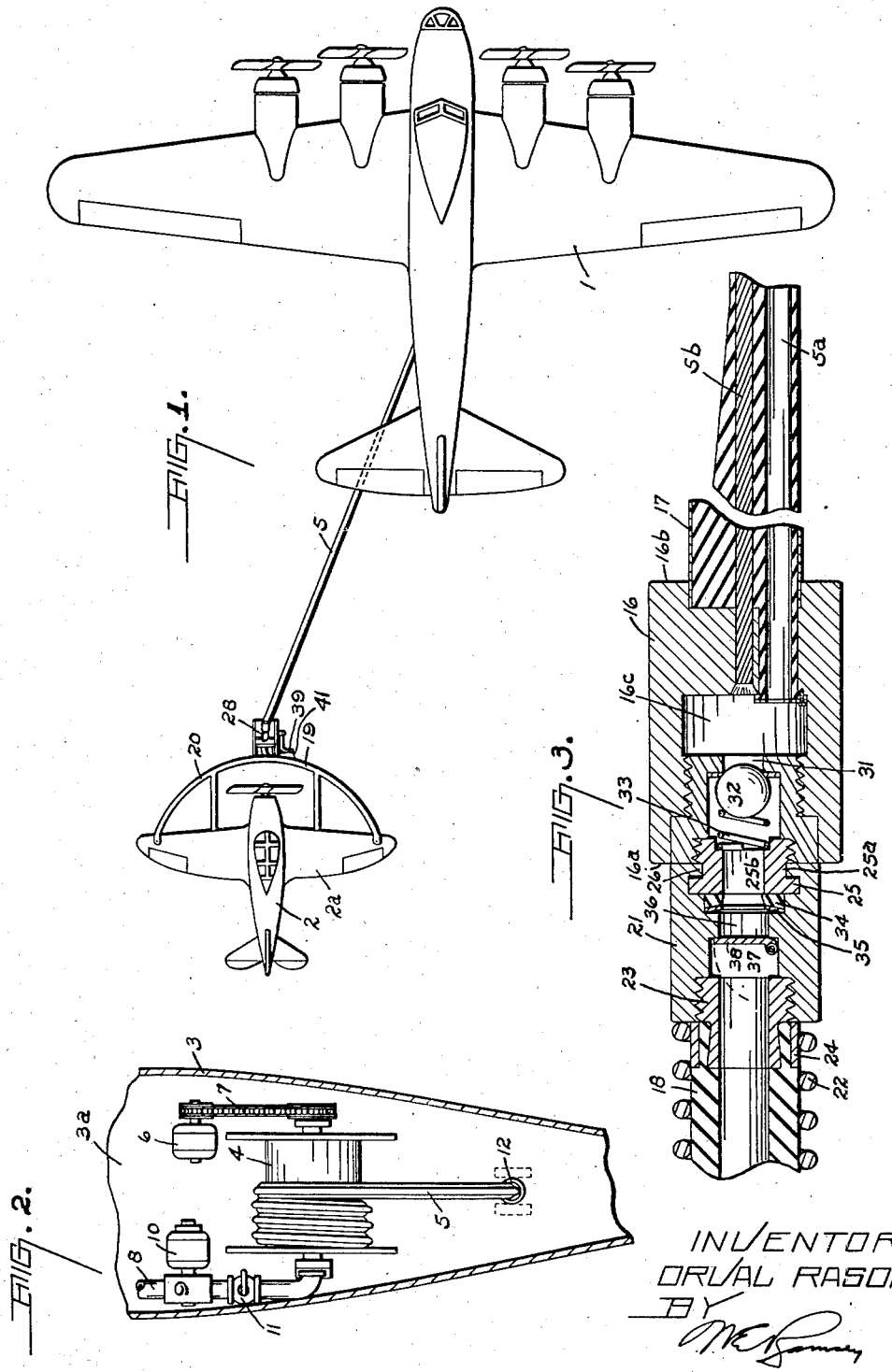
INVENTOR
ORVAL RASOR
BY
ATTORNEY Oct. 30, 1945.　　O. RASOR　　2,388,013
AIRPLANE TOWING MECHANISM
Filed March 25, 1942　　2 Sheets-Sheet 2
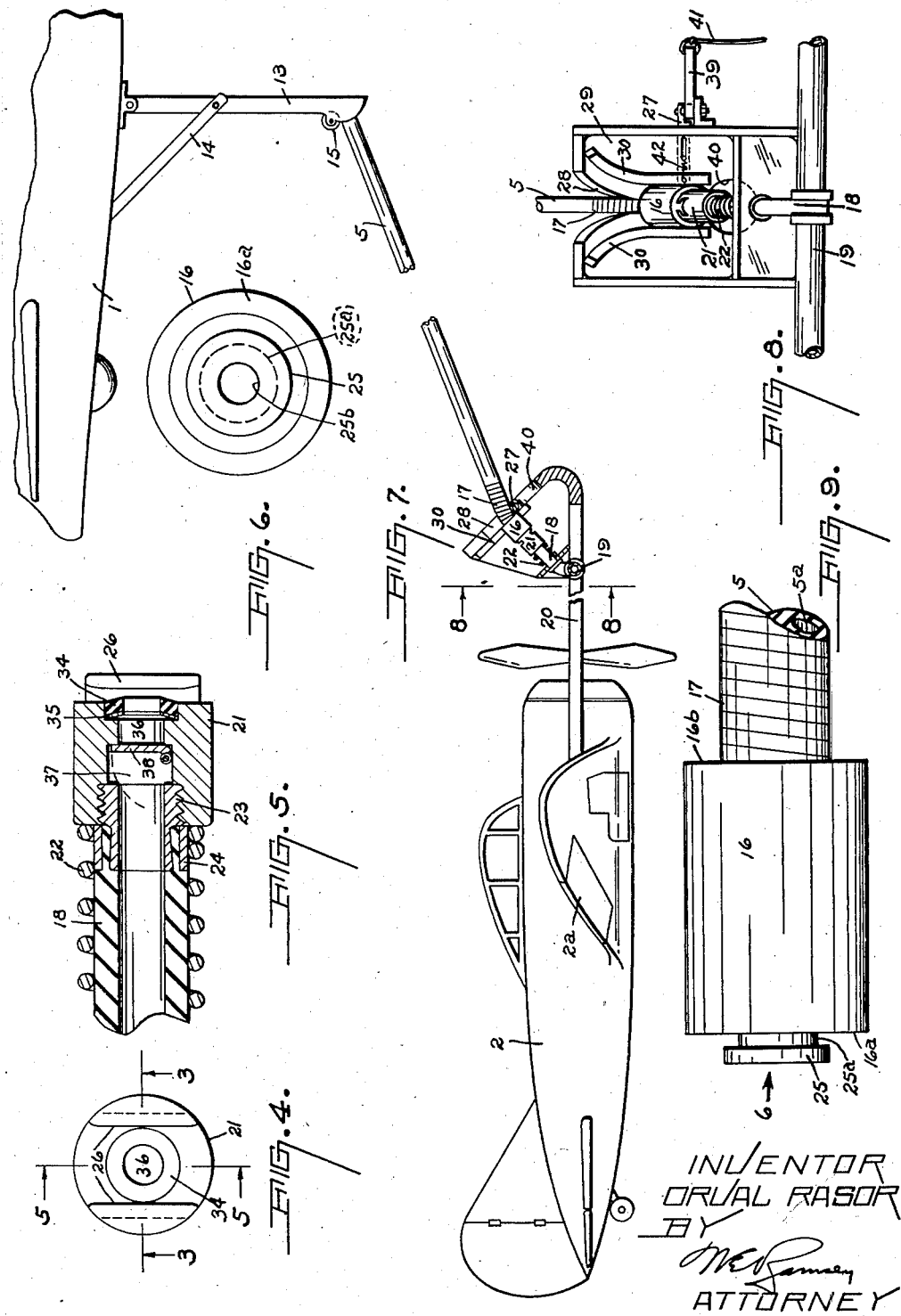

Patented Oct. 30, 1945

2,388,013

UNITED STATES PATENT OFFICE 2,388,013

AIRPLANE TOWING MECHANISM

Orval Rasor, Portland, Oreg.

Application March 25, 1942, Serial No. 436,204

9 Claims. (Cl. 244—3)

The experience of the American armed forces has illustrated the fact that so-called fighter or combat planes do not have sufficient fuel capacity to operate under their own power in making flights of substantial length. Bombing planes and heavier planes do have sufficient fuel capacity and they can make substantial flights over greater range. For example, bombing planes, and other planes of this size, are able to make relatively long flights and to cross the Pacific Ocean under their own power while fighter planes are unable to make flights of this range. Fighter planes, thus, must be taken to pieces and stored on cargo boats and the like to be transported to their destination and there be reassembled for action.

Under ideal fighting conditions, also, it is good practice for bombing planes to be protected by one or more fighter or combat planes. When bombing planes have to fly unattended or unprotected by fighter planes, they are subject to attack when they encounter hostile forces which are efficiently disposed.

The object of my invention is to provide connecting means for bombing planes by which connecting means fighter planes may be towed by bomber planes or may be towed and refueled during flight, or they may be detachably secured to the joined connection so that they can make a refueling connection. Gasoline from a bomber may be supplied to a fighter plane and the connections may be broken in flight so that the two planes, namely, the bombing plane and the fighter or combat plane, may thereafter fly as separate units. That is, it is an object of my invention to provide attaching means between a tractor plane and a trailer plane, which attaching means may be easily and quickly attached and detached when said two planes are in flight. Said attaching means may serve as a towing connection or as a refueling connection, or both.

Said attaching means preferably comprises a towing cable carried by the larger or towing plane and means are provided by which said towing connection may be paid out or retracted at will so as to provide a convenient length or position for said connection for attaching, flying and detaching conditions.

A further object of my invention is to provide a fighter or combat plane with a guard or cable-shearing device arranged forwardly of the propeller and fuselage. Said device is capable, thus, of fending off or severing barrage balloon cables. Said fending or severing device also provides an excellent framework or support for an attaching device which may engage the end of a towing or refueling connection depending from a towing plane or a refueling plane.

A further object of my invention is to provide devices upon the trailing plane which may easily and quickly engage the end of such a depending cable or hose without danger of causing said planes to become out of control. Said device also provides a firm engagement on said trailing plane for a towing or refueling connection arranged in such a manner that a refueling hose will automatically become coupled with a fuel supply line in the trailing plane. Thus, fuel may be passed from the towing plane to the trailing plane without necessitating manual manipulation of the engaging parts.

A further object of my invention is to provide means upon the towing plane by which the end of a towing or refueling cable or hose, or both, may be held more or less stiffly below the undersurface of the fuselage or other part of said towing plane so that the towing or refueling connection is easily engaged by a device on the trailing plane.

A further object of my invention is to provide a coupling device for a refueling hose which will automatically engage with a complementary part so that a secure and leak-proof connection can be made between the refueling hose and the supply line of the trailing plane. Said connection also may be easily and quickly disconnected by distant manipulative means so that said parts may come out of engagement without producing loss or discharge of fuel. Fuel is highly combustible and might produce flame in the trailing plane if any loss or spilling of fuel occurred.

A further and more specific object of my invention is to provide devices of this character which are simple in construction, light in weight, and efficient in action.

Further and other details are hereinafter described with reference to the accompanying drawings in which:

Fig. 1 is a more or less diagrammatic view of a tractor plane and trailing plane shown in operative engagement as for towing or for refueling;

Fig. 2 is a more or less diagrammatic view of retracting means within the towing plane for paying out and retracting a refueling hose and towing cable and for supplying fuel thru the refueling hose to the trailing plane;

Fig. 3 is a longitudinal section thru the coupling devices substantially on the line 3—3 in Fig. 4 between a combined towing and refueling hose and the end of fuel supply conduit in the trailing plane;

Fig. 4 is an end elevation looking toward the coupling device on the fuel supply conduit in the trailing plane;

Fig. 5 is a longitudinal section taken on the line 5—5 in Fig. 4, showing one end of the fuel conduit in said trailing plane with the coupling thereon;

Fig. 6 is an end elevation taken in the direction of arrow 6 in Fig. 9, of the end of the coupling carried by the refueling and towing connection which depends from the towing plane;

Fig. 7 is a fragmentary view of a towing plane showing elevator mechanism by which the towing and refueling connection is held more or less steadily beneath the fuselage of the towing plane and said figure illustrates the manner in which a connection is made to a trailing plane;

Fig. 8 is an enlarged sectional view of the engaging device carried by the trailing plane, said view being taken substantially on the line 8—8 in Fig. 7, said view also illustrates the manner in which the end of the towing and refueling connection is engaged by said device and a connection is made with the end of the fuel supply conduit for the trailing plane; and Fig. 9 is a side elevation of the coupling at the end of the refueling and towing connection.

My invention concerns mechanism by which a towing plane 1 may be detachably secured to a trailing plane 2. My invention has its greatest use, in my opinion, when the towing plane is a relatively large multi-motored bombing plane, for example, and the trailing plane is a smaller fighter or pursuit plane. Carried within the fuselage 3 of the towing plane is a rotatable drum 4 on which a refueling hose and towing cable 5 may be spooled, payed out and be retracted. In Fig. 2, I have diagrammatically illustrated the said drum as being driven by a motor 6 operatively connected with said drum by a chain 7. It is to be understood, however, that said motor and chain are merely illustrative of means, generally, by which said drum may be selectively rotated in either direction or held at one position. A gasoline supply line 8 is joined to the refueling hose 5a and a pump 9 driven by a motor 10 can control the flow of gasoline thru said supply line and into said hose. I also show a cut-off valve 11 in said supply line so that flow thru said line into said hose may be entirely cut off if it is so desired.

The refueling hose and towing cable extends down thru an aperture 12 in the floor 3a of the fuselage and extends along or thru a relative stiff member 13 pivotally secured to the underside of the fuselage. Said stiff member may be extended normal to the fuselage, as is shown in Fig. 6, being held by a brace 14, or may be folded against the fuselage when not in use to cut down wind resistance. The refueling hose and towing cable extends about a guiding roller 15 at the free end of the stiff member 13. On the end of the refueling hose and towing cable is a relatively heavy ferrule or male coupling. One end of towing cable 5b is splayed out, leaded or otherwise secured to the center of said ferrule 16, as is illustrated in Fig. 3, so as to make a firm connection between said ferrule and said cable. The refueling hose preferably is covered by a metal sheathing 17 to protect the exterior thereof. Said metal sheathing preferably is made of spirally wound metal, as is illustrated most clearly in Fig. 7, and serves to protect the exterior of said refueling hose and towing cable against wear, binding and abrasion as will hereinafter be pointed out.

A fuel conduit 18 in the trailing plane extends from the supply line thru tubular framework 19 forming a part of the fending or shearing guard 20 arranged forwardly of the leading edge of wing 2a of said trailing plane. Said guard serves not only as a support for engaging devices for said fuel conduit and for a guide for manipulative control for connecting devices hereinafter described, but also serves to protect said wing and the propeller if said combat or fighter plane strikes cables of barrage balloons or other devices which would otherwise break the propeller or injure said wing.

On the extreme end of said fuel conduit 18 is a female connection 21 leading up from the tubular framework 19, as is shown most clearly in Fig. 7. I preferably provide a spiral wire wrap or spring 22 for said fuel conduit so as to give stiffness to said conduit. Secured to the end of said fuel conduit is a threaded hose connection 23 secured to the fuel conduit by an encompassing band 24.

The engagement is made between the ferrule 16 and the female connecting element 21 by a circular flange 25 on the ferrule and a pair of spaced lips 26 on the connecting element 21. Said circular flange is joined to the head 16a of the ferrule by a neck 25a. Said spaced lips 26 are spaced across a distance slightly greater than the diameter of said neck and defined within said lips is a space sufficient to receive the circular flange 25. Thus, when the circular flange lies behind said lips the flange will engage said lips and longitudinal pull will not separate said devices. This is the position of the parts, as illustrated in Fig. 3. Said parts are held in this position because the connecting element 21 is held in the position shown in Fig. 7 by the spiral wire wrap 22 and the ferrule is held in position by being supported by a transverse pin 27 extending transversely of slot 28 in engaging hook 29 carried by the forward end of the trailing plane 2. Said hook has a slot 28 which is substantially wider than the diameter of the refueling hose and towing cable at its mouth, as is shown in Fig. 8, and narrows down to a width substantially the diameter of said refueling hose and towing cable, as is shown in said figure.

When the parts are arranged in the positions shown in Figs. 7 and 8, said refueling hose and towing cable rests on pin 27 and the parts are then in alinement. The inner face of engaging hook engages the outer face 16b of ferrule 16. I provide guiding flanges upon the inner face of the engaging hook 29 to engage the periphery of the ferrule thereby to hold said ferrule normal to the inner face of said hook. That is, the ferrule 16 slides along the inner face of engaging hook 29 as it moves into engagement, being held normal to said face by the engagement of the guiding flanges 30 about its periphery. It moves into the slot until the transverse pin 27 engages the refueling hose and towing cable 5 and when said ferrule is in this position the circular flange 25 is held by the spaced lips 26 on the fuel conduit 18.

Fuel can then flow along the refueling hose 5a into chamber 16c within the ferrule and pass thru port 31. A ball check valve 32 overlies port 31 and prevents flow of fluid thru said port unless sufficient pressure is applied to the fuel in refueling hose 5a to overcome the tension of coil spring 33 behind said ball check valve. The circular flange 25 and its neck 25a preferably are separate from the ferrule 16 so as to permit said ball check valve and said flange to be replaced. Said neck 25a has a passageway 25b extending thru it to the outer face of said circular flange. The connecting element 21 has a washer 34 seated therein which normally is distended to the position shown in Fig. 5 by a circular plate spring 35 lying behind it. Said washer and said spring are compressed when the flange 25 is engaged by lips 26 and said washer 34 and spring 35 thus provide a tight joint between the circular flange and the connecting element 21.

A passageway 36 in said connecting element 21 joins the central aperture in washer 34 with a chamber 37 within said connecting element and extending to the end of threaded hose connection 23. A spring closed flapper valve 38 normally lies across the face of passageway 36, but may be swung into horizontal position along an arc indicated by dotted lines in Fig. 3, when fuel passes from the right towards the left thru said passageway 36. When fuel is not passing, however, said flapper valve moves under the urging of said spring to the position shown in Fig. 3. Said flapper valve prevents fuel from flowing towards the right from fuel conduit 18 at all times. This prevents leakage of fuel from said fuel conduit 18 when the connecting element 21 is disengaged from the ferrule 16. The ball check valve 32 performs a similar function in the ferrule to prevent gasoline from leaking out of the refueling hose 5a thru the passageways in the ferrule when said parts come out of engagement.

When it is desired to produce uncoupling of the refueling hose and towing cable 5 from the engaging hook 29, pin 27 is moved towards the right, as viewed in Fig. 8, by bell crank lever 39. The slope of said hook tends to cause the ferrule to be moved down said slope to disconnect its circular flange from the spaced lips 26 and to move out into alinement with the larger diametered aperture 40 thru which said ferrule can be pulled endwise. That is, the slot 28 and aperture 40 together form virtually a keyhole slot. The slot will pass the refueling hose and towing cable but will retain the ferrule while the aperture 40 will pass both the refueling hose and towing cable and said ferrule to produce disengagement of said parts.

Said bell crank lever may be actuated by a pull cord 41 which leads along or thru one of the members constituting the fending or shearing guard for the trailing plane. One end of said pull cord may thus be arranged adjacent the cockpit of the trailing plane. A spring 42 tends normally to hold said pin transversely of the slot 28 and thus forms a bottom for the slot. Said pin will be retracted from said slot only when tension is applied to said pull cord.

The operation of my device is as follows: The refueling hose and towing cable may be used to tow a trailing plane for any distance desired. It is to be understood, also, that more than one of said devices may be arranged upon a towing plane so that more than one trailing plane can be conveniently accommodated. If trailing planes are to be towed for any substantial distance, it is my opinion that greatest efficiency may be attained by supplying only sufficient fuel to the engine of the trailing plane to maintain elevation and control. The majority of the traction given to the trailer plane would thus be supplied by the towing plane thru the towing cable. If long flights are to be accomplished with the devices secured in this manner, then fuel may be supplied periodically thru the refueling hose 5a to the supply tanks in the trailing plane when said supply tanks become depleted. It may be desirable only that said parts be connected, as shown in Fig. 7, during actual refueling operations. I deem it desirable that the refueling hose and towing cable 5 be drawn up relatively short below the free end of the stiff member 13 when the planes are to be engaged. I deem this preferable because in this position the ferrule on the end of the refueling hose and towing cable will not swing so widely as it would be if a greater length of said refueling hose and towing cable were unsupported and hanging suspended. When the planes are disconnected and the refueling hose and towing cable is thus arranged a trailing plane can move underneath the towing plane until the ferrule on the refueling hose and towing cable lies just rearwardly of the engaging hook 29. Then if the trailing plane increases its elevation slightly and then drops back the ferrule 16 will be engaged by the slot 28 in the engaging hook and will move down along the sides of said slot until the refueling hose and towing cable engages the transverse pin 27. The parts will then be engaged, as is shown in Fig. 7, and adapted either for towing, with or without refueling.

When the ferrule slides down the inner face of said engaging hook 29 the circular flange 25 on the ferrule will slide between the spaced lips 26 on the fuel conduit and an efficient connection will be made so as to permit fuel to flow from the refueling hose 5a to the fuel conduit 18. Then when it is desired to disconnect said planes, that is, disconnect the engaging hook from the ferrule 16 on the refueling hose and towing cable, this may be accomplished by pulling the cord 41 and retracting the pin 27 from the slot 28 in the engaging hook 29 and the ferrule will move downwardly along the inclined face of the hook and pass endwise thru the larger diametered aperture therein. I deem it preferable that refueling and towing be done with a substantial length of said refueling hose and towing cable lying beyond the guiding roller 15 on the stiff member 13. When a substantial length of said refueling hose and towing cable does extend beyond the guiding roller 15, the hose and cable will trail out rearwardly of the towing plane to an angle somewhat as shown in Fig. 7. The parts thus arranged provide sufficient slope so that fuel flows freely thru the hose 5a and yet the parts are securely engaged but are adapted for disengagement when the pin is retracted from the slot in the engaging hook.

Altho I have shown a refueling hose 5a in connection with towing cable 5b I wish it understood that the detaching mechanism is equally adapted to promote engagement and disengagement of two planes or other vehicles when there is to be no refueling operation performed. It is likewise true that it is not essential, altho I deem it desirable, that a towing cable be associated with the refueling hose. A fabric hose has substantial tensile strength and will resist a certain amount of towing strain, and thus I do not deem it necessary that a towing cable be provided, altho in the majority of cases I believe that a steel cable is most efficient per unit of length to perform this function. I consider this true not only with regard to strength, but also with regard to selection of efficient section and weight per unit of length.

It is to be noted that when the refueling hose is connected to the fuel conduit 18, as is shown in Fig. 8, that the parts extend at quite an oblique angle and thus any amount of fuel which lies exteriorly of the ball check valve will flow into the passageway 36 and past the spring closed flapper valve. The spring for said flapper valve is preferably made quite weak so that said fuel will flow readily past said valve even tho just standing above it. Said flapper valve, however, will prevent fuel from flowing upwardly; that is, towards the right, as viewed in Fig. 3, or upwardly, as viewed in Fig. 7. Thus, there can be no actual spillage of fuel when the parts are disconnected which would be a severe hazard. The ball check valve 32 and the flapper valve are arranged very close together so as to minimize the capacity of the passageways lying between said two members. It may be desirable in some cases that said flapper valve may be made of rubber or other inherently elastic material to permit seepage, but to prevent said fuel from backing up. I consider this feature of my invention to be quite important because if there were any spillage of gasoline in refueling operation, the gasoline might be thrown upon the propeller and would be a potential if not any actual hazard in each case.

I claim:

1. In towing connections of the character described for releasably securing a towing airplane to a trailing airplane, a flexible combined towing and refueling hose secured at one end to said towing airplane and having an enlarged head on the free end of said hose adapted to be engaged by said trailing airplane, a hook-like device on said trailing airplane adapted releasably to engage the enlarged head on said flexible hose, said device having a key-hole slot formed therein, the narrower portions thereof being proportioned to pass said hose but to retain said head, and a retractable member associated with said slot to restrict the movement of said head with respect to said slot when said head is engaged by said device.

2. In towing connections of the character described for releasably securing a towing airplane to a trailing airplane, a flexible combined towing and refueling hose secured at one end to said towing airplane and having an enlarged head on the free end of said hose adapted to be engaged by said trailing airplane, a hook-like device on said trailing airplane adapted releasably to engage the enlarged head on said flexible hose, said device having a key-hole slot formed therein, the narrower portions thereof being proportioned to pass said hose but to retain said head, and a retractable pin extending across said slot to restrict the movement of said head with respect to said slot when said head is engaged by said device.

3. In towing connections of the character described for releasably securing a towing airplane to a trailing airplane, the latter having a fuel conduit, a flexible combined towing and refueling hose secured at one end to said towing airplane and having an enlarged head on the free end of said hose adapted to be engaged by said trailing airplane, an engaging device on said trailing airplane adapted releasably to engage the enlarged head on said flexible hose, and a hose connection, one-half being arranged upon said head and the other half upon the fuel conduit of said trailing airplane, and said hose connection including means for automatically coupling when said head is engaged by said device.

4. In towing connections of the character described for releasably securing a towing airplane to a trailing airplane, the latter having a fuel conduit, a flexible combined towing and refueling hose secured at one end to said towing airplane and having an enlarged head on the free end of said hose adapted to be engaged by said trailing airplane, an engaging device on said trailing airplane adapted releasably to engage the enlarged head on said flexible hose, and a hose connection, one-half being arranged upon said head and the other half upon the fuel conduit of said trailing airplane, said hose connection including means for automatically coupling when said head is engaged by said device, said hose connection engaging and disengaging automatically under lateral shift of the parts thereof.

5. In towing connections of the character described for releasably securing a towing airplane to a trailing airplane, the latter having a fuel conduit, a flexible combined towing and refueling hose secured at one end to said towing airplane and having an enlarged head on the free end of said hose adapted to be engaged by said trailing airplane, an engaging device on said trailing airplane adapted releasably to engage the enlarged head on said flexible hose, and a hose connection, one-half being arranged upon said head and the other half upon the fuel conduit of said trailing airplane, said hose connection including means for automatically coupling when said head is engaged by said device, said hose connection comprising a necked flange upon one of said halves and a lipped engaging device on the other half said parts being shifted sidewise into and out of engagement with each other.

6. In towing connections of the character described for releasably securing a towing airplane to a trailing airplane, the latter having a fuel conduit, a flexible combined towing and refueling hose secured at one end to said towing airplane and having an enlarged head on the free end of said hose adapted to be engaged by said trailing airplane, an engaging device on said trailing airplane adapted releasably to engage the enlarged head on said flexible hose, and a hose connection, one-half being arranged upon said head and the other half upon the fuel conduit of said trailing airplane, said hose connection including means for automatically coupling when said head is engaged by said device, and guides upon said device for slidably engaging the sides of said head for directing the hose connection halves into mutual engagement.

7. In towing connections of the character described for releasably securing a towing airplane to a trailing airplane, the latter having a fuel conduit, a flexible combined towing and refueling hose secured at one end to said towing airplane and having an enlarged head on the free end of said hose adapted to be engaged by said trailing airplane, an engaging device on said trailing airplane adapted releasagly to engage the enlarged head on said flexible hose, and a hose connection, one-half being arranged upon said head and the other half upon the fuel conduit of said trailing airplane, and check valves in said refueling hose and said fuel conduit, respectively, arranged adjacent the line of separation of said hose connection halves to limit the capacity of said hose connections lying adjacent said line of separation of said hose connection halves.

8. In towing connections of the character described for releasably securing a towing airplane to a trailing airplane, a flexible combined towing and refueling hose secured at one end to said towing airplane and having an enlarged head on the free end of said hose adapted to be engaged in flight by said trailing airplane, a stiff member secured to said towing airplane engaging said flexible hose and being adjusted laterally of said towing airplane to steady said flexible hose, thus to facilitate engagement of the enlarged head on the free end of said hose by said trailing airplane, and an engaging device on said trailing airplane adapted releasably to engage the enlarged head on said flexible hose, and to make fluid connection therewith.

9. In towing connections of the character described for releasably securing a towing airplane to a trailing airplane, the latter having a fuel conduit, a flexible combined towing and refueling hose secured at one end to said towing airplane and having an enlarged head on the free end of said hose adapted to be engaged in flight by said trailing airplane, an engaging device on said trailing airplane adapted releasably to engage the enlarged head on said flexible hose, a retractable member associated with said slot to restrict the movement of said head with respect to said slot when said head is engaged by said device, and a hose connection, one-half being arranged upon said head and the other half upon the fuel conduit of said trailing airplane, and means on said hose connection automatically coupling when said head is engaged by said device.

ORVAL RASOR.